United States Patent
Perricone (10) Patent No.: US 7,132,928 B2
(45) Date of Patent: Nov. 7, 2006

(54) THREAT DETECTION SYSTEM INTERFACE

(76) Inventor: Nicholas V. Perricone, 337 Research Pkwy., Meriden, CT (US) 06450

( * ) Notice: Subject to any disclaimer, the term of this patent is extended or adjusted under 35 U.S.C. 154(b) by 78 days.

(21) Appl. No.: 10/706,536

(22) Filed: Nov. 12, 2003

(65) Prior Publication Data
US 2005/0073439 A1    Apr. 7, 2005

(51) Int. Cl.
*H04B 3/36*    (2006.01)
(52) U.S. Cl. .................. 340/407.1; 340/961; 340/963; 340/964; 340/965
(58) Field of Classification Search ............ 340/407.1, 340/961, 965, 7.6; 701/301
See application file for complete search history.

(56) References Cited

U.S. PATENT DOCUMENTS

| | | | |
|---|---|---|---|
| 3,157,853 A * | 11/1964 | Hirsch | 340/965 |
| 3,337,839 A * | 8/1967 | Nelkin | 367/105 |
| 3,626,411 A | 12/1971 | Litchford | 343/6 R |
| 3,680,115 A | 7/1972 | Bickel et al. | 343/105 R |
| 3,735,408 A | 5/1973 | Litchford | 343/112 |
| 3,736,551 A * | 5/1973 | Hirsch | 367/134 |
| 3,757,324 A | 9/1973 | Litchford | 343/6.5 R |
| 3,858,210 A | 12/1974 | Litchford | 343/11 R |
| 3,858,211 A | 12/1974 | Litchford | 343/16 R |
| 3,875,570 A | 4/1975 | Litchford | 343/6.5 LC |
| 3,895,382 A | 7/1975 | Litchford | 343/6.5 LC |
| 3,921,172 A | 11/1975 | Litchford | 343/16 R |
| 3,959,753 A | 5/1976 | Litchford | 343/6.5 R |
| 4,008,456 A * | 2/1977 | Ewart | 340/407.1 |
| 4,021,802 A | 5/1977 | Litchford | 343/6.5 LC |
| 4,027,307 A | 5/1977 | Litchford | 343/6.5 |
| 4,107,674 A | 8/1978 | Funatsu et al. | 343/6.5 R |
| 4,115,771 A | 9/1978 | Litchford | 343/6 R |
| 4,161,729 A | 7/1979 | Schneider | 343/6.5 R |
| 4,196,434 A | 4/1980 | Funatsu et al. | 343/6.5 R |
| 4,293,857 A | 10/1981 | Baldwin | 343/6.5 R |
| 4,442,430 A | 4/1984 | Schneider | 343/6.5 R |
| 4,486,755 A | 12/1984 | Hulland et al. | 343/6.5 LC |
| 4,487,191 A * | 12/1984 | Piteo | 123/652 |
| RE32,252 E * | 9/1986 | Kay | 367/102 |
| 4,713,651 A * | 12/1987 | Morag | 340/407.1 |
| 4,733,241 A | 3/1988 | Litchford et al. | 342/453 |
| 4,782,450 A | 11/1988 | Flax | 364/461 |
| 4,910,526 A | 3/1990 | Donnangelo et al. | 342/455 |
| 4,967,641 A * | 11/1990 | Chambre | 89/41.08 |
| 5,032,841 A | 7/1991 | Shulenberger | 342/37 |
| 5,122,804 A | 6/1992 | Shulenberger | 342/37 |
| 5,307,137 A * | 4/1994 | Jones et al. | 356/4.01 |
| 5,493,309 A | 2/1996 | Bjornholt | 342/455 |
| 5,565,840 A * | 10/1996 | Thorner et al. | 340/407.1 |
| 5,647,016 A * | 7/1997 | Takeyama | 382/103 |
| 5,835,059 A | 11/1998 | Nadel et al. | 342/398 |
| 5,901,246 A | 5/1999 | Hoffberg et al. | 382/209 |
| 5,903,454 A | 5/1999 | Hoffberg et al. | 364/188 |
| 5,986,582 A * | 11/1999 | Greene et al. | 340/965 |
| 6,091,321 A * | 7/2000 | Karell | 340/425.5 |
| 6,097,315 A * | 8/2000 | Minter | 340/961 |

(Continued)

*Primary Examiner*—Benjamin C. Lee
*Assistant Examiner*—Son Tang
(74) *Attorney, Agent, or Firm*—St. Onge Steward Johnston & Reens LLC (57) ABSTRACT

A threat detection system interface that provides translates threat diction information into a tactile signal for a user to indicate the direction and distance of an identified threat relative to an object. The threat detection system interface having applications for use with military vehicles, and in particular military aircraft, but also having application in connection with flight training simulators, computer and/or video games.

26 Claims, 7 Drawing Sheets

U.S. PATENT DOCUMENTS

| | | | |
|---|---|---|---|
| 6,223,125 B1 * | 4/2001 | Hall | 701/301 |
| 6,273,371 B1 * | 8/2001 | Testi | 244/223 |
| 6,290,183 B1 | 9/2001 | Johnson et al. | 244/170 |
| 6,400,996 B1 | 6/2002 | Hoffberg et al. | 700/83 |
| 6,418,424 B1 | 7/2002 | Hoffberg et al. | 706/21 |
| 6,580,417 B1 * | 6/2003 | Rosenberg et al. | 345/157 |
| 6,590,832 B1 | 7/2003 | Dubois et al. | 367/92 |
| 6,671,618 B1 * | 12/2003 | Hoisko | 701/205 |
| 6,744,370 B1 * | 6/2004 | Sleichter et al. | 340/576 |
| 6,831,572 B1 * | 12/2004 | Strumolo et al. | 340/903 |

* cited by examiner

THREAT DETECTION SYSTEM INTERFACE

FIELD OF THE INVENTION

The present invention relates to a tactile interface for threat detection systems utilized by vehicle pilots, particularly for aircraft and most especially, military aircraft and flight training and/or simulations.

BACKGROUND OF THE INVENTION

Aircraft and specifically military aircraft are routinely provided with threat detection systems. These threat detection systems may include for instance, RADAR, Global Positioning Systems ("GPS"), or any other appropriate detection system for the application, to detect surrounding threats. These threats may include, for instance, hostile aircraft or weapons whether air or land based. These threat detection systems typically include an interface, such as a visual and/or an audible warning to indicate proximity of a hostile aircraft and/or weapon. A visual interface display may further indicate the relative location of the hostile aircraft and/or weapon to the pilot's aircraft.

However, while an audible interface may provide the pilot with some information relating to the proximity of hostile aircraft and/or weapons, it will not inform the pilot of the hostile aircraft and/or weapon location relative to the pilot's aircraft.

Visual interfaces will provide this information, but because high performance fighter jets travel at such high speeds, it is disadvantageous for the pilot to have to split his attention between looking at, for instance, a visual interface such as a RADAR screen and keeping direct visual track of threats. Another challenge facing the pilot is that there are many instruments that must be consulted and potentially a number of different threats to identify and track visually, both directly in his field of vision and on the displays. As a result, the pilot may overlook a threat in a crowded airspace, which could have disastrous consequences.

In view of the forgoing, what is desired then is a threat detection system interface that will provide an alert to a pilot of an aircraft of the location of any hostile aircraft and/or weapon relative to the pilot's aircraft while not requiring the pilot to visually or audibly identify this information.

It is further desired to provide a threat detection system interface that will provide an alert to a pilot of an aircraft of the distance of any hostile aircraft and/or weapon relative to the pilot's aircraft while not requiring the pilot to visually or audibly identify this information.

It is still further desired to provide a threat detection system interface that will provide an indication to the pilot of both the location and distance relative to the pilot's aircraft of any hostile aircraft and/or weapon while not interfering with the pilot's ability to maintain visual contact of additional hostile aircraft and/or weapons.

It is still further desired to provide a threat detection system interface that will provide an indication to the pilot of the location and distance of multiple hostile aircraft and/or weapon relative to the pilot's aircraft while not requiring the pilot to visually or audibly identify this information.

SUMMARY OF THE INVENTION

An interface for a threat detection system is provided that conveys information to the pilot through his tactile senses. This method of conveying information is greatly preferred because it does not interfere with the pilot's ability to visually track direct threats or require the pilot to divert his attention from other instrumentation. This method is also preferred over audible interfaces because it can indicate to the pilot the location and distance of any hostile aircraft and/or weapon relative to the aircraft. It is conceivable that an audible interface could also convey this information, but would require much more of the pilot's attention to decipher and would be even more difficult for the pilot to manage the information where multiple threats were in proximity to the aircraft.

In accordance with the invention an interface system comprising a harness, a flight suit, garment, or other body fitting means with a network of vibratory units or other tactile sensation generators which are networked to the existing aircraft threat detection system such as, for instance, a RADAR or GPS system. The tactile sensation generators may include, for instance but not limited to, a transducer that may generate, an oscillation such as a vibration, or may locally generate heat or cold, or may generate a pressure, or may even selectively apply electromagnetic energy to a portion of the user's body. The tactile sensation generators act as a tactile interface between the existing threat detection system and the pilot. For instance, the threat detection system may determine the location and distance of a threat relative to the aircraft and then transmit this information to the interface system that is networked to the threat detection system. The interface system then provides tactile information to the pilot in the form of, for instance, a vibration positioned in three-dimensional space along an axis directed toward the identified threat or threats.

It is contemplated that the location of the vibration will alert the pilot as to the location of the threat. For example, the threat detection system may identify a hostile aircraft and/or weapon relative to the aircraft. The threat detection system then transmits this information to the interface system, which causes a vibratory element located on the harness, flight suit, garment, or other body-fitting means to vibrate. The pilot may then determine the direction of the threat relative to the pilot's aircraft. It is further contemplated that the vibratory element may be modulated according to the distance of the identified threat relative to the pilot's aircraft. For instance, the vibratory element may vibrate at a higher frequency or at varying intervals when the identified threat approaches or withdraws from the pilot's aircraft. In this manner, the pilot is alerted to the location and distance of any hostile aircraft and/or weapon relative to the pilot's aircraft without having to divert his attention to a screen or to decipher complicated audio information. This in turn will simplify and reduce the information transfer time from the threat detection system to the pilot, thereby allowing him more reaction time and greater concentration for other tasks.

Although the invention has been described here utilizing a plurality of vibratory elements, it is contemplated that any of the above-listed tactile sensation generators by effectively be utilized.

The term "data" as used herein means any indicia, signals, marks, domains, symbols, symbol sets, representations, and any other physical form or forms representing information, whether permanent or temporary, whether visible, audible, acoustic, electric, magnetic, electromagnetic, or otherwise manifested. The term "data" as used to represent particular information in one physical form shall be deemed to encompass any and all representations of the same particular information in a different physical form or forms.

The term "storage" as used herein means data storage devices, apparatus, programs, circuits, systems, subsystems, or other elements whether implemented in hardware, software, or both, and whether used to process data in analog or digital form, into which data may be entered, and from which data may be obtained, as desired. Storage can be primary and/or secondary and can store data in electromagnetic, magnetic, optical, magneto-optical chemical and/or holographic forms.

The term "processor" as used herein means data processing devices, apparatus, programs, circuits, systems, and subsystems, whether implemented in hardware, software, or both, and whether used to process data in analog or digital form. The processor can operate on data in electromagnetic, magnetic, optical, magneto-optical chemical and/or holographic forms.

The terms "communicate", "communicating" and "communications" as used herein include both conveying data from a source to a destination, as well as delivering data to a communications medium, system or link to be conveyed to a destination. The term "communication" as used herein means the act of communicating or the data communicated, as appropriate.

The terms "coupling", "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

The term "network" as used herein means the communications linkage used to join two or more units, such as systems, networks, links, nodes, equipment, circuits, buses, and devices and includes without limitation networks of all kinds, including coupling amongst components of a system, both intra-networks and inter-networks and including, but not limited to, the Internet, and is not limited to any particular such network.

In one advantageous embodiment a threat detection interface system for providing an alert to an operator of a vehicle relating to a threat identified by a threat detection system is provided comprising a control interface coupled to the threat detection system for resolving a threat detection signal. The system further comprises a plurality of vibratory units selectively located in a harness to be worn by the operator, the harness being coupled to the control interface, and a control signal generated by the control interface for controlling the plurality of vibratory units based upon a determined direction and distance of the identified threat relative to the vehicle.

In another advantageous embodiment a threat detection interface system for providing an alert signal to a user, the alert signal relating to an identified threat relative to an identified position of an object is provided, the system comprising a plurality of vibratory units selectively located in a harness to be worn by the user. The system further comprises a control interface coupled to the plurality of vibratory units, the control interface generating a control signal based upon the identified threat, the control signal controlling the plurality of vibratory units based on a determined direction and distance of the identified threat relative to the object.

In still another advantageous embodiment a method of indicating to a user the location of an identified threat relative to a position of an object is provided, the method comprising the steps of inputting information into a control interface relating to a location of the identified threat relative to the position of the object. The method further comprises the steps of generating a control signal corresponding to the received information to control a selected vibratory unit contained in a harness worn by the user, and outputting the control signal to the selected vibratory unit to indicate to the user the location of the identified threat relative to the position of the object.

In yet another advantageous embodiment a threat detection interface system for providing an alert signal to a user, the alert signal relating to an identified threat relative to an identified position of an object is provided, the system comprising, a plurality of tactile sensation generators selectively located to be in tactile communication with the user. The system further comprises a control interface coupled to the plurality of tactile sensation generators, the control interface generating a control signal based upon the identified threat, the control signal controlling the plurality of tactile sensation generators based on a determined direction and distance of the identified threat relative to the object.

In still another advantageous embodiment a wearable threat alerting system is provided comprising, a plurality of vibratory elements and means for positioning the vibratory elements against a body of a person. The system further comprises means for receiving threat position information from a threat detection system and mapping the threat position information to the plurality of vibratory elements such that a position of a threat relative to an object is mapped to one or more of the plurality of vibratory elements. The system still further comprises means for energizing the plurality of vibratory elements when the threat position information is mapped to the plurality of vibratory elements.

The invention and its particular features and advantages will become more apparent from the following detailed description considered with reference to the accompanying drawings.

DETAILED DESCRIPTION OF THE DRAWINGS

Figure 1:
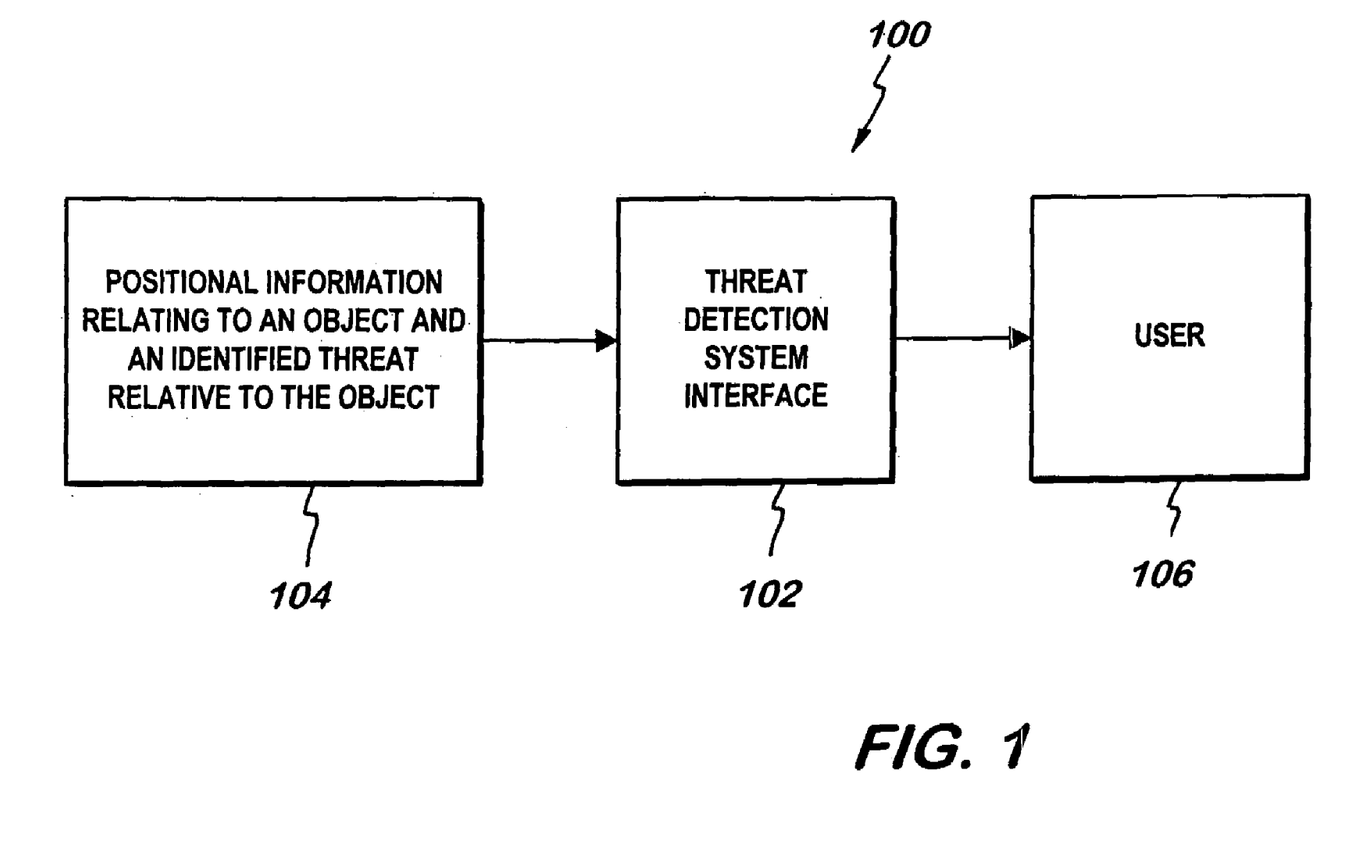
FIG. 1 is a block diagram of the threat detection system and the interface system.

FIG. 1 is a block diagram illustrating the interface system 100 according to the present invention. The interface system illustrated in FIG. 1 comprises threat detection system interface 102, which has an input including positional information relating to an object and an identified threat relative to the object 104, and an output to a user 106.

Positional information 104 includes information relating to the location of an identified threat to an object. There are a number of applications for which this information may be useful. For instance, as previously identified, if may be advantageous for the operator of a vehicle to be able to identify a threat relative to his vehicle. It is applicable to a pilot of an aircraft, in particular, a pilot of a fighter aircraft, a bomber aircraft and/or helicopters. However, this information is also adaptable to other vehicles, such as armored vehicles and tanks. This information may also be adapted for civilian aircraft as a proximity warning system suitable to warn of potential collisions. It is further contemplated that this information is useful for users in training simulators that train pilots in tactical combat situations. It is still further contemplated that this information may be useful for commercial computer and/or video game applications, such as in a combat simulation.

Where threat detection system interface 102 is utilized in connection with an aircraft, and in particular a military aircraft, positional information 104 may be received from a threat detection system (not shown), such as a RADAR, GPS, infrared systems, acoustic systems, vision systems or any other appropriate system for the application. Threat detection system interface 102 receives positional information 104, and translates this information into an output for transmission to user 106.

Figure 2:
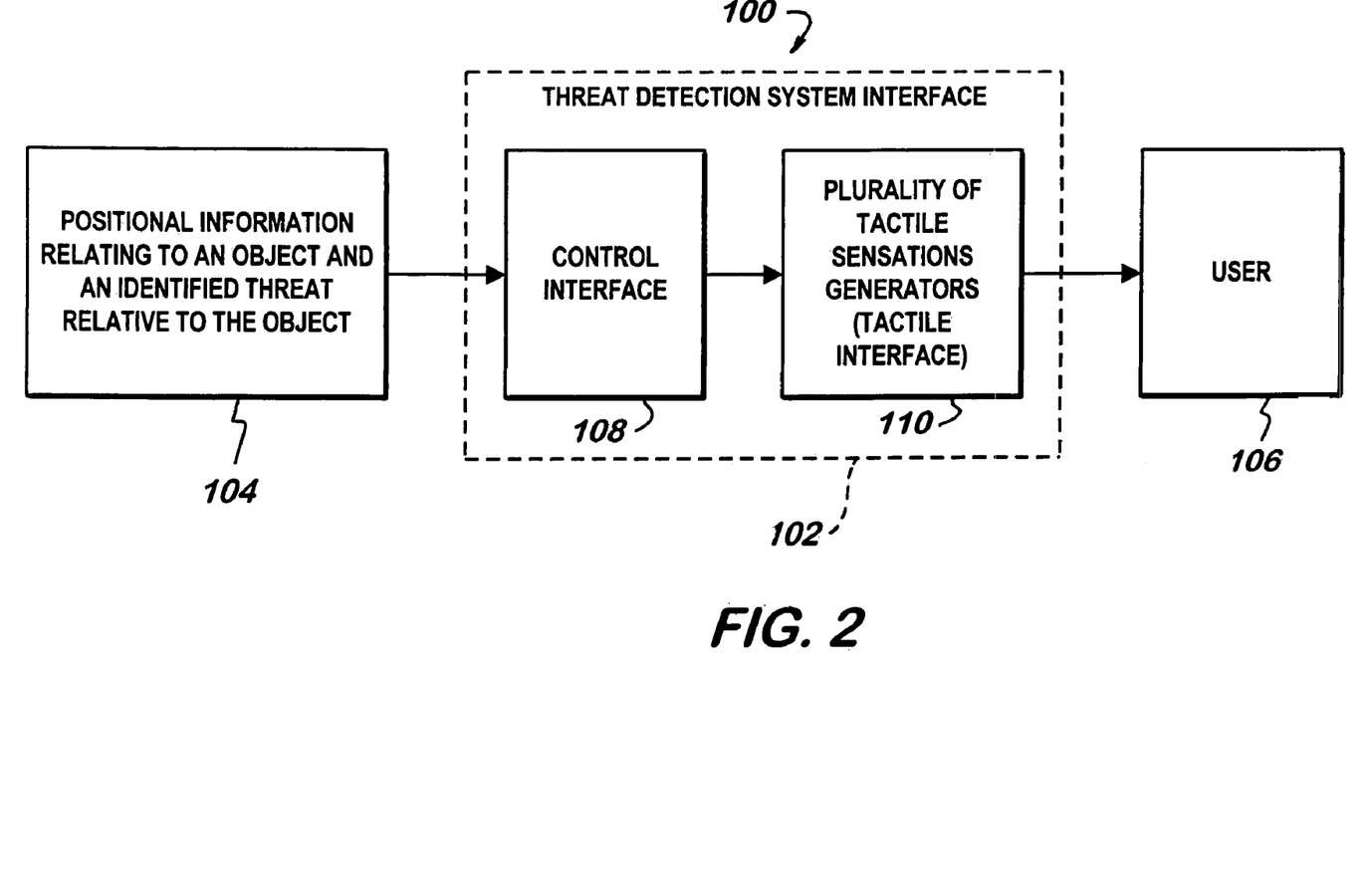
FIG. 2 is a block diagram of the interface system according to FIG. 1.

Referring now to FIG. 2, threat detection system interface 102 is illustrated in more detail. In this advantageous embodiment, threat detection system interface 102 comprises control interface 108 and plurality of tactile sensation generators 110. As previously described herein, the plurality of tactile sensation generators 110 may include, for instance but are not limited to, a transducer that may generate, an oscillation such as a vibration, or may locally generate heat or cold, or may generate a pressure, or may even selectively apply electromagnetic energy to a portion of the user's body. Control interface 108 may comprise for instance; analog and/or digital electronic circuitry, computer software, hardware and/or firmware, and optical transducers and/or circuitry. Control interface 108 may be selected based upon the form and format of positional information 104. Positional information 104 may comprise a signal generated by, for instance a threat detection system (not shown) utilized by military vehicles, especially aircraft, or may comprise a signal generated by a training and/or simulation system. Positional information 104 may still further comprise a signal generated in connection with a computer or video game.

It is important however that control interface 108 comprise a rapid processor control system for interfacing with the threat detection system (not shown) which maps identified threats determining direction and distance from an object, such as for instance, the pilot, a vehicle such as an aircraft, or any other object.

The plurality of tactile sensation generators 110, in one advantageous embodiment comprising a plurality of vibratory units, are connected to and controlled by control interface 108. Based upon the received positional information 104, control interface 108 will generate a control signal to actuate selected tactile sensation generators of the plurality of tactile sensation generators 110. In one advantageous embodiment, the plurality of tactile sensation generators 110 is contained in a harness to be worn by user 106 such that they are in tactile communication with user 106. The harness may be worn alone or may be contained in an article worn by user 106 such as in a flexible sheet across the back; or around the entire torso. Alternatively, the harness may be integral to or detachably connectable to: a flight suit, a vest, a helmet, or any article of clothing. Another potential embodiment includes vibratory elements positioned around every part of the body in a closely fitted suit and skull cap of stretch material. Still further, the harness may comprise webbing or straps that may be equipped and worn by user 106.

In another advantageous embodiment, the plurality of tactile sensation generators 110 may comprise any number of electrically energized buzzers, vibrators or the like. For example, the vibrating elements may comprise miniature DC motors with a small weight affixed to the motor shaft in a position off-center from the rotational axis of the motor, thereby producing a discernable vibration when the motor is energized. It is contemplated that any number of miniature vibrating elements may be utilized such as is commonly utilized in mobile phones or pagers that can be used to provide a constant or oscillating vibration frequency.

In any of the above-listed embodiments, the harness is in tactile communication with user 106 such that when the threat detection system identifies a threat, threat detection system interface 102 will actuate a selected vibratory unit to convey the threat information to user 106.

Referring back to control interface 108, the step of mapping the position of the identified threat relative to the object and/or mapping the threat to actuate a corresponding selected tactile sensation generator or group of tactile sensation generators requires continuous real time detection and recalculation as the relative positions of the identified threat and the object changes over time. Control interface 108 maps the threat position, based on received positional information 104, to a selected tactile sensation generator or group of tactile sensation generators causing them to actuate, which indicates the relative position of the identified threat to user 106. The relative position of the identified threat is indicated by the selected tactile sensation generator(s) positioned on the side of the body facing towards the identified threat. Preferably, the position of the identified threat is mapped to one or more tactile sensation generators positioned in or near an axis extending from user 106 to the identified threat. The mapping of the identified threat enables user 106 to keep track of the position of the identified threat relative to the position of an object such as, user 106 or a vehicle, without requiring user 106 to visually observe the identified threat on, for instance, a screen.

It is still further contemplated that control interface 108 may also communicate the distance of the identified threat to user 106 by controlling the frequency of the plurality of tactile sensation generators 110, or for instance, by modulating the duration of each activation period. When vibratory units are utilized, the frequency of the vibration may be controlled, as well as the duration of each vibratory pulse in, for instance, a series of vibratory pulses. Higher frequencies or shorter pulse durations can, for instance, indicate closer proximity of the identified threat to the object. The same method may be utilized for any type of tactile sensation generators 110 utilized. For instance, heat or cold generated may be increased or decreased base upon the distance of the identified threat to user 106. Alternatively, an electromagnetic energy may also be modulated to indicate the distance of the identified threat to user 106.

Figure 3:
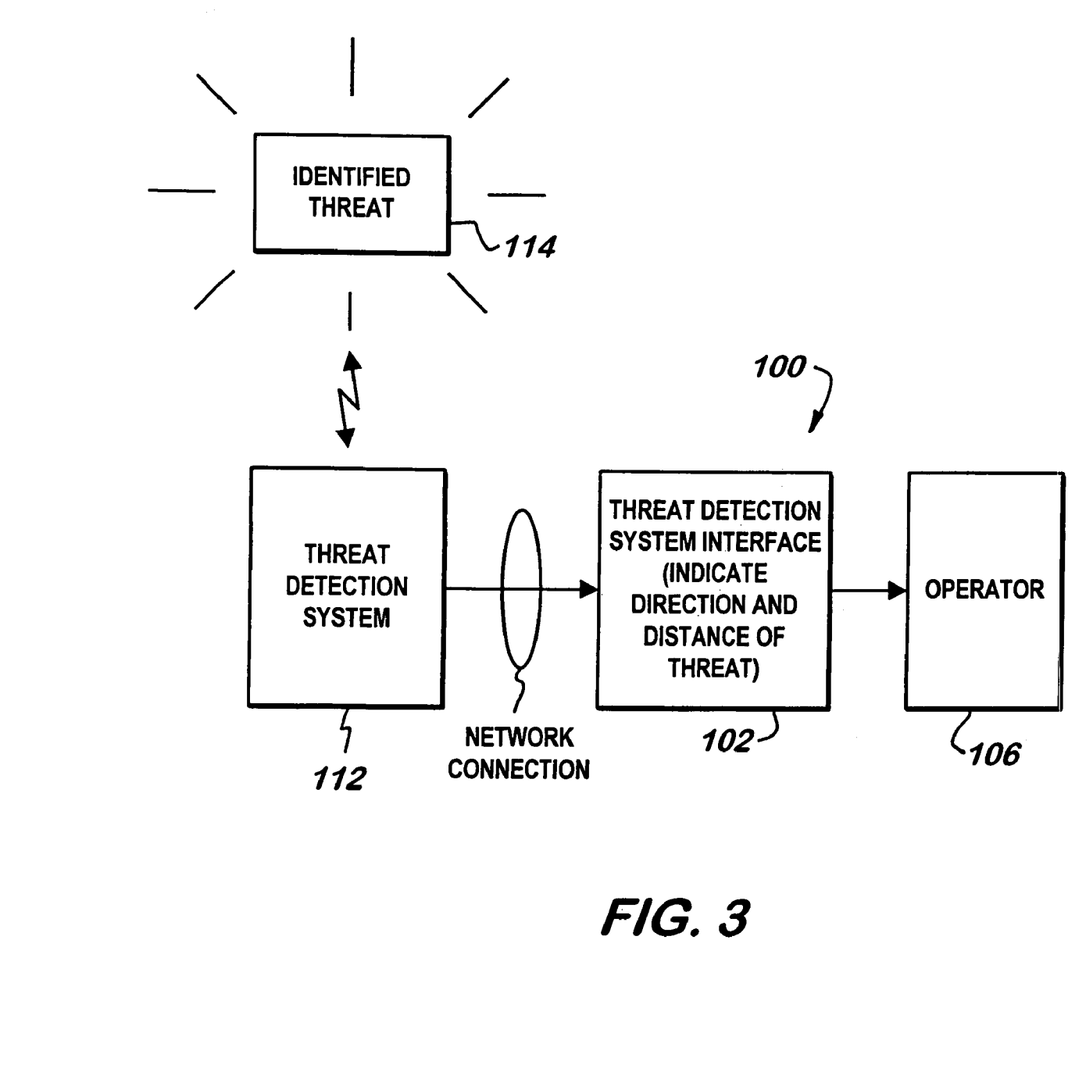
FIG. 3 is a block diagram of the interface system according to one advantageous embodiment.

FIG. 3 is an illustration of one advantageous embodiment of the present invention as applied for use with a vehicle, such as a military aircraft, operated by an operator 106. As is indicated in FIG. 3, threat detection interface system 102 is connected to threat detection system 112 via a network connection. The network connection may comprise for instance, a hard wired and/or wireless network, e.g. employing bus connections, parallel cable, serial cable, coaxial cable, fiber optic, twisted wire pair, USB cable, infrared link, radio frequency link, microwave link, satellite link and/or the like.

Threat detection system 112 may comprise any type of detection system as previously described herein. Threat detection system 112 constantly gathers information relating to any potential threat. Once threat detection system 112 identifies a threat 114, this information is processed and transmitted to threat detection interface system 102, which in turn maps the direction and distance of identified threat 114 to a tactile sensation generator(s) worn by operator 106. In this manner, operator 106 may keep track of any identified threat 114 relative to an object such as operator 106, his vehicle/craft, or another vehicle/craft.

It is further contemplated that threat detection interface system 102 may be connected, via the network connection, to a threat avoidance system (not shown), such that the interface system 100, rather than indicate a distance and direction of identified threat 114, would indicate which direction operator 106 should maneuver his vehicle and at what speed this should accomplished to avoid an incoming identified threat 114.

Figure 4A:
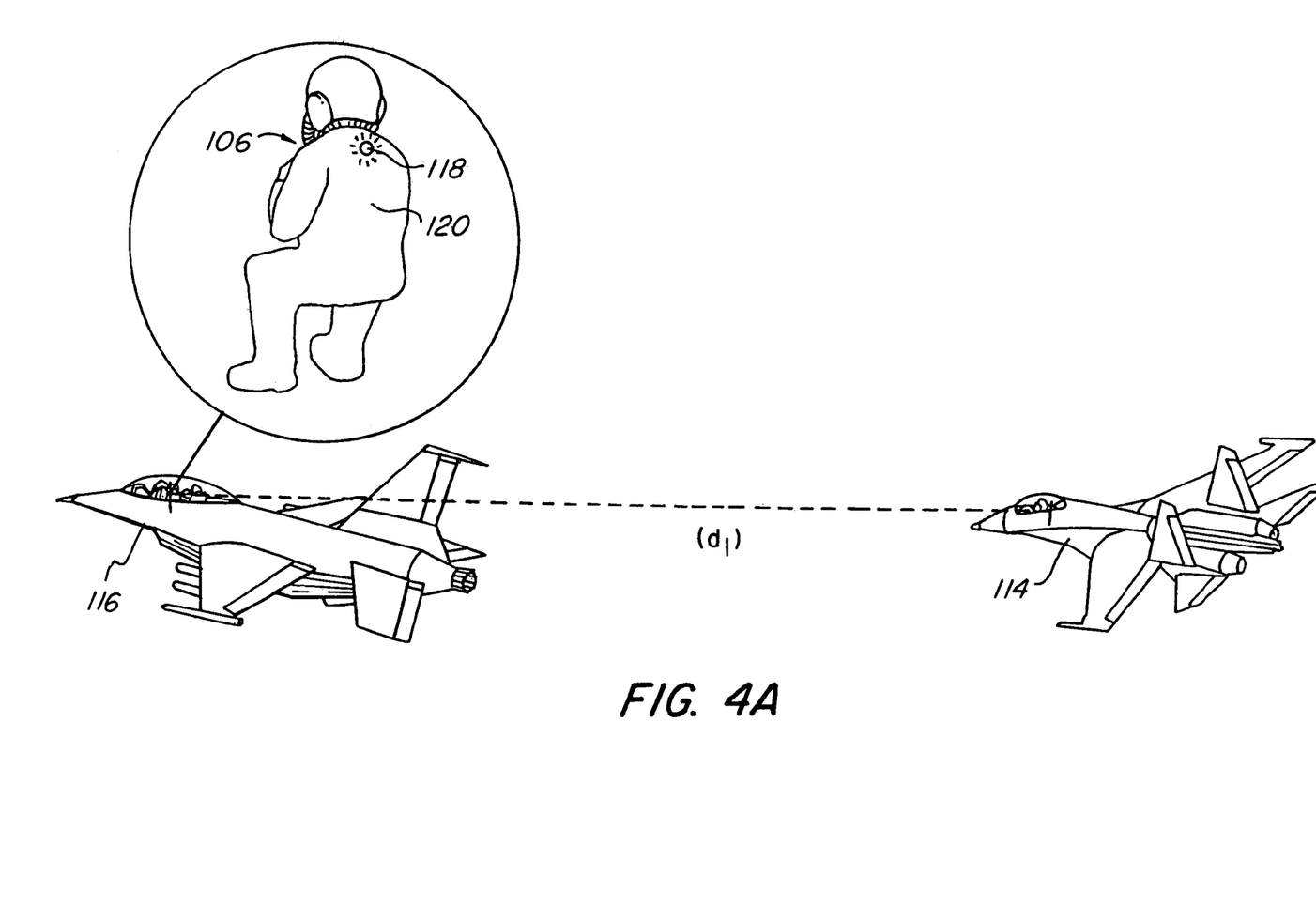
FIG. 4A is an illustration of the interface system in use with the threat detection system according to FIG. 1.
Figure 4B:
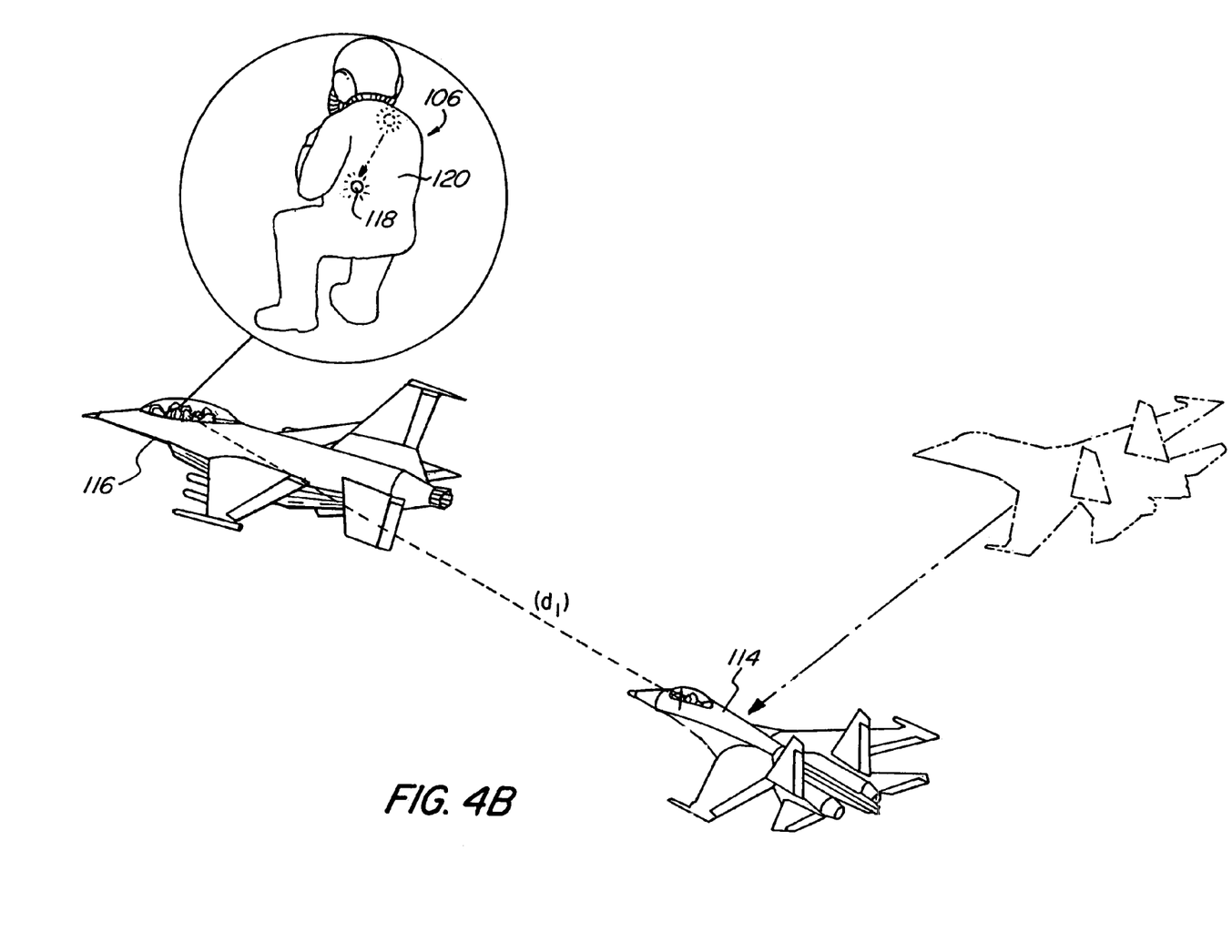
FIG. 4B is another illustration of the interface system in use with the threat detection system according to FIG. 1.
Figure 4C:
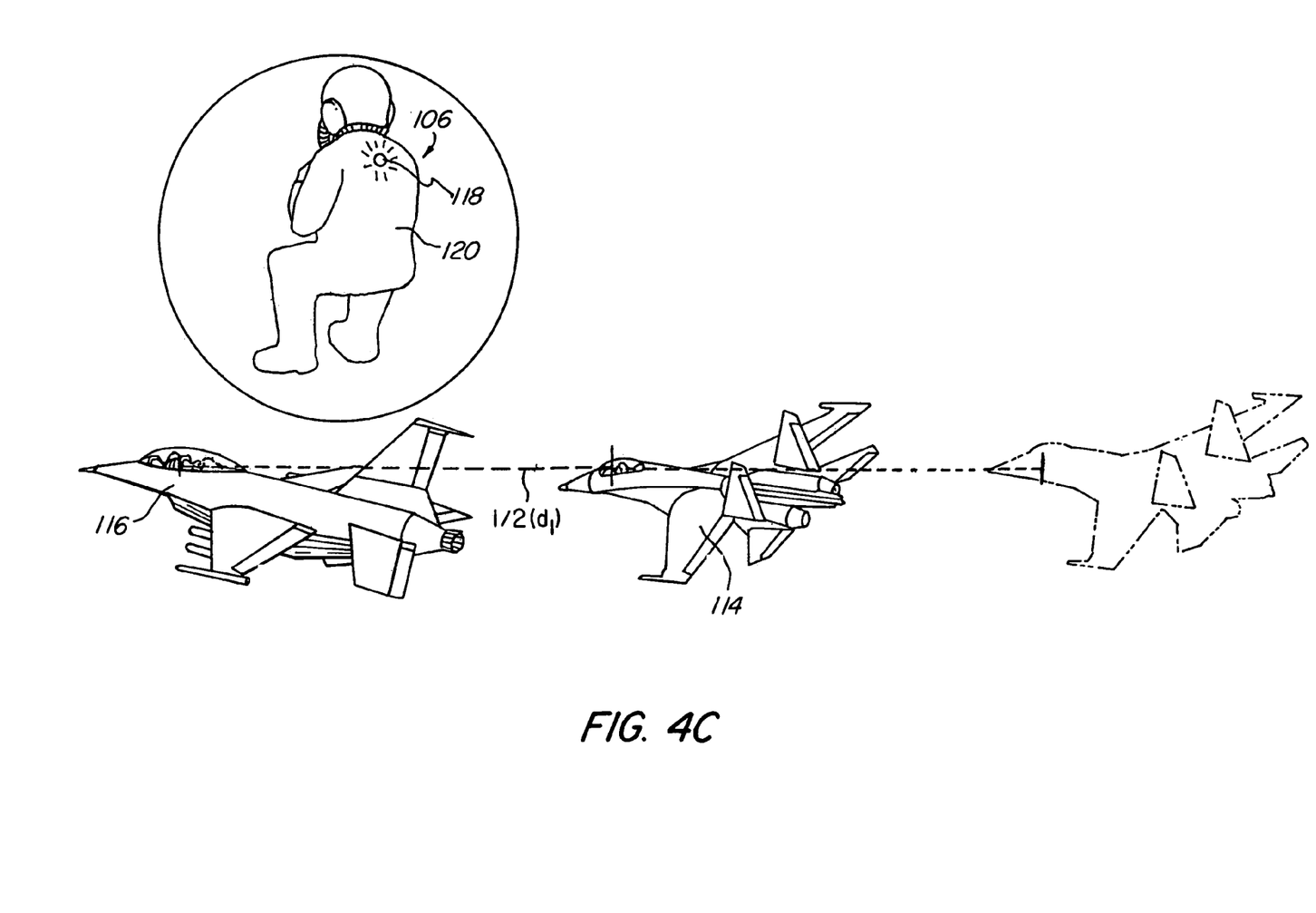
FIG. 4C is still another illustration of the interface system in use with the threat detection system according to FIG. 1.

FIGS. 4A–4C illustrates an advantageous embodiment of the present invention according to FIG. 3. Referring first to FIG. 4A, a vehicle 116, in this embodiment a military fighter aircraft, is located a distance ($d_1$) from identified threat 114, which in this embodiment is also a military fighter aircraft.

Threat detection system 112 detects identified threat 114 and sends threat detection information to threat detection system interface 102. This information is mapped to a selected tactile sensation generator 118 located in a harness 120 worn by operator 106. In FIG. 4A, identified threat 114 is illustrated as being behind, upward and to the right relative to aircraft 116. Accordingly, the threat detection information sent to threat detection system interface 102 will include this relative direction information that is in turn mapped to selected tactile sensation generator 118 to communicate to operator 106 the location of identified threat 114 relative to him. This interface method is highly desirable because operator 106 is instantly alerted not only to the presence of identified threat 114, but also its relative position without having to look at a screen or decipher audible information.

Harness 120 may comprise any advantageous form as previously described herein including indication across the operator's 106 head, torso and legs.

FIG. 4B illustrates the interface system 100 according to FIG. 4A except as can be seen by the dashed lines, identified threat 114 has moved down and to the left relative to aircraft 116. This movement may be due to either aircraft 116 or identified threat 114 moving relative to each other. In either event, operator 106 is instantly made aware of the relative movement by the activation and deactivation of selected tactile sensation generators 118 as indicated by the arrow across the back of operator 106. In this manner, operator 106 is constantly updated as to the relative position of identified threat 114.

While not illustrated, it is anticipated that the relative movement of identified threat 114 to, for instance, a position directly above operator 106, a selected tactile sensation generator 118 would be activated on top of the operator's 106 head. Alternatively, if identified threat 114 where to move to a position below operator 106, a selected tactile sensation generator 118 would be activated underneath one of the legs of operator 106. When however, identified threat 114 moves in front of aircraft 116, it is contemplated that operator 106 may then visually track identified threat 114 without need of the tactile interface. Alternatively, interface system 100 could also activate a selected tactile sensation generator 118 on the front of the operator's 106 torso.

Referring now to FIG. 4C, interface system 100 is again illustrated according to FIG. 4A. However, as noted, the distance ($d_1$) of FIG. 4A is now reduced to a distance of ½($d_1$). This distance may have changed for any number of reasons, such as aircraft 116 slowing down or identified threat 114 speeding up, or combinations of both. In any event, selected tactile sensation generator 118 communicates this change in distance to operator 106 by a change in modulation as illustrated in FIG. 4C with additional lines emanating from selected tactile sensation generator 118. This indication may take any form as previously described herein, such as a change in the frequency (increases as the distance gets smaller and decreases as the distance grows larger), a change in the pulse width or modulation.

As can be seen then from FIGS. 4A–4C, any change in the direction and/or the distance between aircraft 116 and identified threat 114 will be communicated to operator 106 by means of threat detection system interface 102. In this manner, operator 106 may easily keep track of identified threat 114 without having to consult a visual screen thereby allowing him greater concentration for other tasks.

Figure 5:
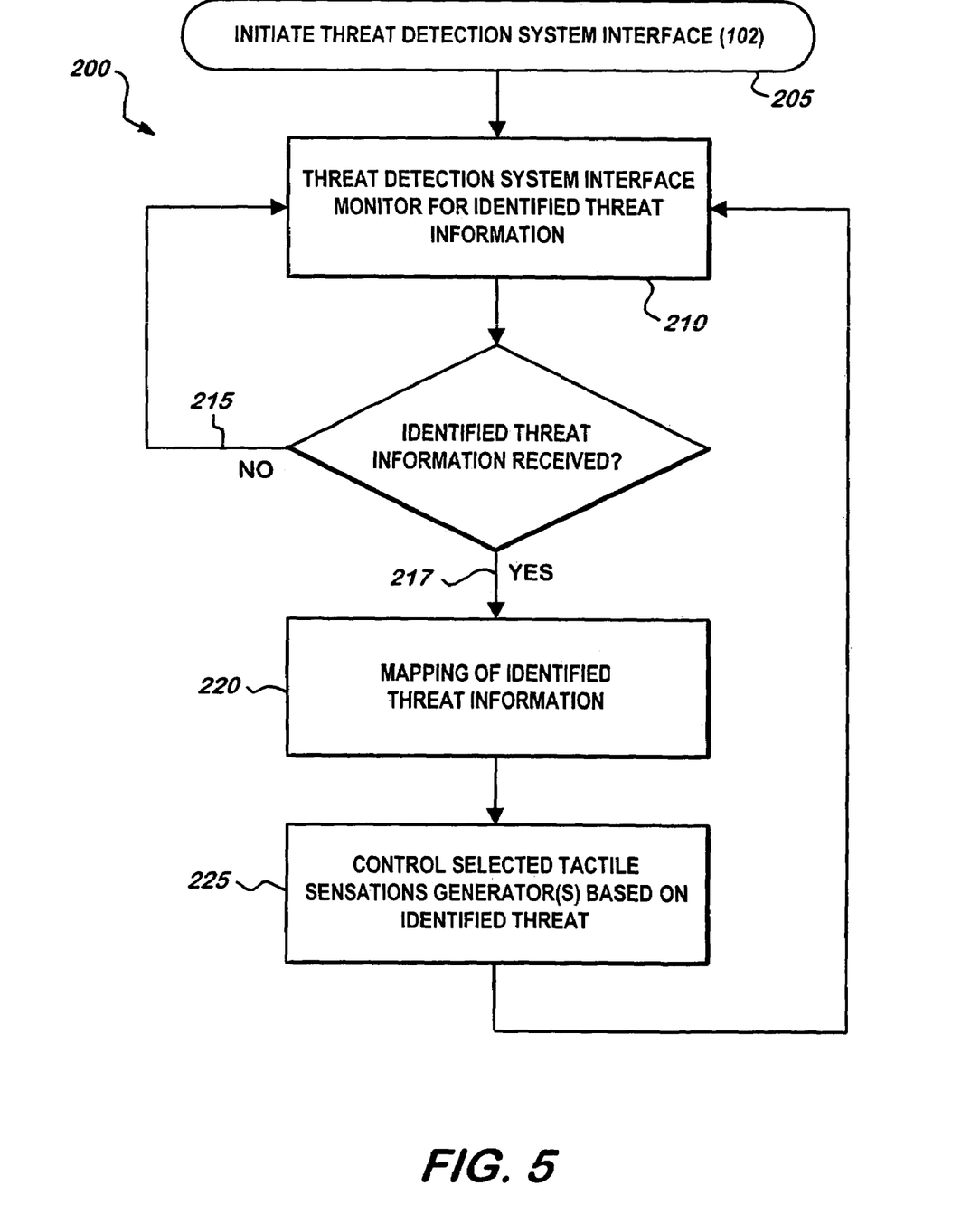
FIG. 5 is a flowchart showing some information processing steps according to one advantageous embodiment of the present invention.

FIG. 5 illustrates still another advantageous embodiment of the present invention, depicting a flow chart 200 sequencing steps interface system 100 may proceed through. As an initial step, threat detection system interface 102 is initiated 205. Threat detection system interface 102 then monitors for receipt of identified threat information 210. If identified threat information is not received 215, threat detection system interface 102 continues to monitor for receipt of identified threat information 210. Alternatively, if identified threat information is received 217, threat detection system interface 102 proceeds to map or correlate the identified threat information 220.

The next step illustrated in connection with flow chart 200 is to control selected tactile sensation generator(s) based on the identified threat information 225. In this manner, selected tactile sensation generator(s) will be activated and modulated and/or deactivated based upon the control signal sent to the plurality of tactile sensation generators. It is apparent that in combat situations, it is imperative that the refresh interval in which the control signal is sent must be very short, such as at a minimum many times a second. This in turn will keep operator 106 instantly up-to-date with any sudden changes in direction and/or distance between aircraft 116 and identified threat 114.

Again, while this previous embodiment has been described in connection with military aircraft, it is contemplated that this system may be utilized in connection with any type of military vehicle including: helicopters, and land vehicles. It is further contemplated that the invention may be utilized in connection with commercial aircraft, training simulators, both military and commercial, and with computer and/or video games.

In connection with a simulator or video game for instance, it is contemplated that the plurality of tactile sensation generators may be located in a chair or seat the player may be seated in. However, the tactile sensation generators may also be selectively located in a harness located in or on the

What is claimed is:

1. A threat detection interface system for providing an alert to an operator of a vehicle relating to a threat identified by a threat detection system comprising:
   a control interface coupled to the threat detection system for resolving a threat detection signal;
   a plurality of vibratory units in tactile communication with the operator, said plurality of vibratory units being coupled to said control interface; and
   a control signal generated by said control interface for controlling said plurality of vibratory units based upon a determined direction and distance of the identified threat relative to the vehicle;
   wherein the plurality of vibratory units indicate a three-dimensional location of the identified threat relative to the vehicle wherein said plurality of vibratory units is distributed on the operator's torso, head and legs.

2. The detection interface system according to claim 1 wherein the control signal activates a selected vibratory unit based upon the direction of the identified threat relative to the vehicle.

3. The detection interface system according to claim 1 wherein the control signal modulates a selected vibratory unit based upon the distance of the identified threat relative to the vehicle.

4. The detection interface system according to claim 1 wherein the control signal selectively activates and modulates multiple vibratory units based upon the direction and distance respectively, of multiple identified threats relative to the vehicle.

5. The detection interface system according to claim 1 wherein said plurality of vibratory units is located in a harness worn by the operator.

6. The detection interface system according to claim 5 wherein the harness is integral to an article worn by the operator.

7. The detection interface system according to claim 1 wherein said plurality of vibratory units is distributed on the operator's back.

8. A threat detection interface system for providing an alert signal to a user, the alert signal relating to an identified threat relative to an identified position of an vehicle, the system comprising:
   a plurality of vibratory units selectively located to be in tactile communication with the user; and
   a control interface coupled to said plurality of vibratory units, said control interface generating a control signal based upon the identified threat, the control signal controlling said plurality of vibratory units based on a determined direction and distance of the identified threat relative to the vehicle;
   wherein the plurality of vibratory units indicate a three-dimensional location of the identified threat relative to the vehicle; wherein said plurality of vibratory units is distributed around the operator's torso.

9. The detection interface system according to claim 8 wherein the control signal activates a selected vibratory unit based upon the direction of the identified threat relative to the vehicle.

10. The detection interface system according to claim 8 wherein the control signal modulates a selected vibratory unit based upon the distance of the identified threat relative to the vehicle.

11. The detection interface system according to claim 8 wherein the control signal activates and modulates selected multiple vibratory units based upon the direction and distance respectively, of multiple identified threats relative to the vehicle.

12. The detection interface system according to claim 8 wherein the plurality of vibratory units is located in a seating device utilized by the user.

13. The detection interface system according to claim 8 wherein said plurality of vibratory units is located in a harness worn by the user.

14. A method of indicating to a user the location of an identified threat relative to a position of an vehicle, the method comprising the steps of:
   inputting information into a control interface relating to a distance and direction of the identified threat relative to the position of the vehicle;
   generating a control signal corresponding to the received information to control at least one of a plurality of vibratory units in tactile communication with the user; and
   outputting the control signal to the selected vibratory unit to indicate to the user the distance and direction of the identified threat relative to the position of the vehicle;
   wherein the plurality of vibratory units indicate a three-dimensional location of the identified threat relative to the vehicle; wherein said plurality of vibratory units is distributed around the operator's torso.

15. The method according to claim 14 further comprising the step of activating a selected vibratory unit with the control signal based on an identified direction of the identified threat relative to the position of the vehicle.

16. The method according to claim 14 further comprising the step of modulating a selected vibratory unit based on an identified distance of the identified threat relative to the position of the vehicle.

17. The method according to claim 14 wherein the plurality of vibratory units is located in a harness worn by the user.

18. The method according to claim 17 wherein the harness is integral to an article worn by the user.

19. A wearable threat alerting system, comprising:
   a plurality of vibratory elements;
   means for positioning said vibratory elements against a body of a person;
   means for receiving threat distance and direction information from a threat detection system and mapping the threat distance and direction information to said plurality of vibratory elements such that a position distance and direction of a threat relative to an vehicle is mapped to one or more of said plurality of vibratory elements;
   means for energizing said plurality of vibratory elements when the threat distance and direction information is mapped to said plurality of vibratory elements to provide a threat detection signal that indicates to the person the distance and direction of the threat relative to the person wherein the plurality of vibratory units indicate a three-dimensional location of the identified threat relative to the vehicle; wherein said plurality of vibratory units is distributed around the operator's torso.

20. The wearable threat alerting system in accordance with claim 19 wherein said threat detection system is selected from the group consisting of: a RADAR system, an infrared system, an acoustic system, a vision system, and combinations thereof.

21. The wearable threat alerting system in accordance with claim 19 wherein said means for positioning comprises a flexible material positioned against the user's back.

22. The wearable threat alerting system in accordance with claim 19 wherein said means for positioning comprises a garment.

23. The wearable threat alerting system in accordance with claim 19 wherein said means for positioning comprises a vest surrounding the user's torso.

24. The wearable threat alerting system in accordance with claim 19 wherein the position of a threat is mapped to one or more vibratory elements positioned in or near an axis extending from said body of the user to the threat.

25. The wearable threat alerting system in accordance with claim 19 wherein said plurality of vibratory elements have a variable vibration frequency, and the wearable threat alerting system further includes means for energizing said plurality of vibratory elements at a selected vibration frequency depending on the distance from the threat to the vehicle.

26. The wearable threat alerting system in accordance with claim 19 wherein said plurality of vibratory elements have a fixed vibration frequency, and the wearable threat alerting system further includes means for energizing said plurality of vibratory elements in pulses of variable duration, with the duration of the pulse depending on the distance from the threat to the vehicle.

* * * * *

UNITED STATES PATENT AND TRADEMARK OFFICE
CERTIFICATE OF CORRECTION

PATENT NO. : 7,132,928 B2 Page 1 of 1
APPLICATION NO. : 10/706536
DATED : November 7, 2006
INVENTOR(S) : Nicholas V. Perricone It is certified that error appears in the above-identified patent and that said Letters Patent is hereby corrected as shown below:

Title Page #60 should read Provisional application No. 60/507,531, filed on October 1, 2003.

Signed and Sealed this

Ninth Day of January, 2007

JON W. DUDAS
*Director of the United States Patent and Trademark Office*